US010997537B2

United States Patent
Kawano

(10) Patent No.: US 10,997,537 B2
(45) Date of Patent: May 4, 2021

(54) INFORMATION PROCESSING APPARATUS, SYSTEM, METHOD, AND NON-TRANSITORY COMPUTER-READABLE STORAGE MEDIUM FOR ADJUSTING A NUMBER OF WORKERS IN A WORKSHOP

(71) Applicant: CANON KABUSHIKI KAISHA, Tokyo (JP)

(72) Inventor: Atsushi Kawano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 16/232,473

(22) Filed: Dec. 26, 2018

(65) Prior Publication Data

US 2019/0205814 A1 Jul. 4, 2019

(30) Foreign Application Priority Data

Dec. 28, 2017 (JP) .............................. JP2017-254403
Mar. 27, 2018 (JP) .............................. JP2018-060741

(51) Int. Cl.
*G06Q 10/06* (2012.01)
*G06K 9/00* (2006.01)

(52) U.S. Cl.
CPC . *G06Q 10/063116* (2013.01); *G06K 9/00624* (2013.01); *G06K 9/00771* (2013.01); *G06K 9/00785* (2013.01)

(58) Field of Classification Search
CPC ....... G06Q 10/063114; G06Q 10/1097; G06Q 10/105; G06Q 10/0631; G06Q 10/06;
(Continued)

(56) References Cited

U.S. PATENT DOCUMENTS 5,809,161 A * 9/1998 Auty .......................... G01P 3/38
340/937
5,886,648 A * 3/1999 McElroy ................... B60S 3/04
134/123
(Continued)

FOREIGN PATENT DOCUMENTS

EP          3032475 A1    6/2016
JP       H10-214290 A    8/1998
(Continued)

OTHER PUBLICATIONS

Extended European Search Report issued by the European Patent Office dated Jun. 4, 2019 in corresponding European Patent Application No. 18212179.8.
(Continued)

*Primary Examiner* — Scott L Jarrett
(74) *Attorney, Agent, or Firm* — Carter, Deluca & Farrell LLP

(57) ABSTRACT

An information processing apparatus comprising a calculation unit configured to determine a type of each vehicle included in an image obtained by capturing a first area where vehicles stand by, and calculate the first number of vehicles of each type, a decision unit configured to decide, in accordance with the first number of vehicles of each type, notification information concerning workers to be allocated in a second area where a predetermined work that changes in accordance with the type of the vehicle is conducted, and an output unit configured to output the notification information.

22 Claims, 9 Drawing Sheets

(58) Field of Classification Search
CPC ....... G06Q 10/06311; G06Q 10/06315; G06Q 10/063112; G06K 9/00771; G06K 9/0624
See application file for complete search history.

(56) References Cited

U.S. PATENT DOCUMENTS

| | | | | |
|---|---|---|---|---|
| 7,113,892 | B2* | 9/2006 | Inoue | G06Q 10/10 |
| | | | | 702/187 |
| 7,580,547 | B2* | 8/2009 | Benhammou | G06K 9/00785 |
| | | | | 382/103 |
| 7,650,293 | B2* | 1/2010 | Kiran | G06Q 10/06315 |
| | | | | 705/7.25 |
| 8,069,072 | B2* | 11/2011 | Ingman | G06Q 10/063 |
| | | | | 705/7.13 |
| 8,229,171 | B2* | 7/2012 | Takahashi | G06K 9/00771 |
| | | | | 382/104 |
| 8,379,913 | B1* | 2/2013 | Robinson | G06K 9/6254 |
| | | | | 382/100 |
| 8,503,725 | B2* | 8/2013 | Wu | G06T 7/187 |
| | | | | 382/103 |
| 9,239,955 | B2* | 1/2016 | Bhanu | G06K 9/6857 |
| 9,390,621 | B2* | 7/2016 | Cuende Alonso | |
| | | | | G06K 9/00637 |
| 9,646,210 | B2* | 5/2017 | Nye | G06K 9/00771 |
| 9,811,739 | B2* | 11/2017 | Fan Chiang | G06F 16/5838 |
| 9,865,056 | B2* | 1/2018 | Bernal | G08G 1/0175 |
| 9,870,648 | B2* | 1/2018 | Moran | G08G 1/065 |
| 10,026,315 | B2* | 7/2018 | High | G06Q 10/0631 |
| 10,062,042 | B1* | 8/2018 | Kelly | G06Q 10/063112 |
| 10,074,026 | B2* | 9/2018 | Sun | G06K 9/3241 |
| 10,176,405 | B1* | 1/2019 | Zhou | G06T 7/246 |
| 10,402,870 | B2* | 9/2019 | Hogg | G06Q 20/202 |
| 10,527,433 | B2* | 1/2020 | Baughman | G06Q 10/0631 |
| 10,664,808 | B2* | 5/2020 | Washington | G06Q 10/08 |
| 10,726,723 | B1* | 7/2020 | Madden | G08G 1/146 |
| 10,776,952 | B2* | 9/2020 | Jung | G06N 3/08 |
| 2003/0189500 | A1* | 10/2003 | Lim | G08G 1/04 |
| | | | | 340/937 |
| 2004/0260513 | A1* | 12/2004 | Fitzpatrick | G06Q 30/02 |
| | | | | 702/182 |
| 2005/0050091 | A1* | 3/2005 | Inoue | G06Q 10/06 |
| 2005/0065834 | A1* | 3/2005 | Hale | G07C 9/37 |
| | | | | 700/83 |
| 2005/0267657 | A1* | 12/2005 | Devdhar | G06K 9/0063 |
| | | | | 701/33.4 |
| 2005/0273228 | A1* | 12/2005 | Tsubota | G06Q 10/06 |
| | | | | 701/31.4 |
| 2007/0194115 | A1* | 8/2007 | Logan | G07C 1/20 |
| | | | | 235/385 |
| 2007/0293997 | A1* | 12/2007 | Couch | G01M 17/007 |
| | | | | 701/31.4 |
| 2009/0024438 | A1* | 1/2009 | Ingman | G06Q 30/0201 |
| | | | | 705/7.13 |
| 2009/0182635 | A1* | 7/2009 | Parisi | G06Q 30/02 |
| | | | | 705/14.62 |
| 2011/0029349 | A1* | 2/2011 | Omiya | G06Q 10/063112 |
| 2011/0258011 | A1* | 10/2011 | Burns | G06Q 50/12 |
| | | | | 705/7.15 |
| 2013/0070056 | A1* | 3/2013 | Tripathi | G06Q 10/06 |
| | | | | 348/46 |
| 2015/0066561 | A1* | 3/2015 | Wills | G06Q 10/06314 |
| | | | | 705/7.23 |
| 2015/0098621 | A1* | 4/2015 | Bernal | G07C 11/00 |
| | | | | 382/104 |
| 2015/0170445 | A1* | 6/2015 | Bajekal | G07C 9/28 |
| | | | | 340/5.61 |
| 2016/0162817 | A1* | 6/2016 | Grimaldi | G06Q 10/20 |
| | | | | 705/7.27 |
| 2016/0188953 | A1* | 6/2016 | Tabb | G06K 9/46 |
| | | | | 382/103 |
| 2016/0259341 | A1* | 9/2016 | High | G05D 1/0219 |
| 2017/0124378 | A1* | 5/2017 | High | G06Q 10/06315 |
| 2017/0243488 | A1* | 8/2017 | Meijer | G08G 1/0112 |
| 2017/0282794 | A1* | 10/2017 | Kowatari | H04N 7/181 |
| 2019/0009683 | A1* | 1/2019 | Saito | H02J 7/00 |
| 2019/0164128 | A1* | 5/2019 | Millhouse | G06Q 10/0833 |
| 2019/0389074 | A1* | 12/2019 | High | B25J 19/04 |

FOREIGN PATENT DOCUMENTS

| | | |
|---|---|---|
| JP | 2001-143110 A | 5/2001 |
| JP | 2004-295253 A | 10/2004 |
| JP | 2014-035633 A | 2/2014 |
| JP | 2014178931 A | 9/2014 |
| WO | 0046068 A1 | 8/2000 |

OTHER PUBLICATIONS

Search Report and Written Opinion issued by the Intellectual Property Office of Singapore dated Jul. 1, 2019 in corresponding Singapore Patent Application No. 10201811682R in the English language.

* cited by examiner

FIG. 3A

| VEHICLE TYPE ~311 | NUMBER OF INSPECTION ITEMS ~312 | PROCESSING TIME 1 ~313 | PROCESSING TIME 2 ~314 |
|---|---|---|---|
| STANDARD-SIZED CAR | 10 | 2 min | 1 min |
| BUS | 30 | 5 min | 3 min |
| TRUCK | 50 | 3 min | 2 min |
| • | • | • | • |
| • | • | • | • |

| ID ~321 | NAME ~322 | DATE ~323 | WORK START TIME ~324 | BREAK TIME ~325 | WORK END TIME ~326 | TYPE IN CHARGE ~327 | INSPECTION FORM ~328 |
|---|---|---|---|---|---|---|---|
| 1111 | ICHIRO TANAKA | 2017/12/20 | 9:00 | 12:00-12:45 | 17:00 | BUS INSPECTION | PAIR |
| 1112 | JIRO SATOU | 2017/12/20 | 11:00 | 14:00-14:30 | 19:00 | — | — |
| 1113 | SABURO SUZUKI | 2017/12/20 | 9:00 | 12:00-12:45 | 17:00 | TRUCK INSPECTION | ALONE |
| 1114 | SHIRO YAMADA | 2017/12/20 | 13:00 | 16:00-16:30 | 20:00 | — | — |
| 1115 | GORO TAKAHASHI | 2017/12/20 | 9:00 | 13:30-14:30 | 19:00 | STANDARD-SIZED CAR INSPECTION | ALONE |
| • | • | • | • | • | • | • | • |
| • | • | • | • | • | • | • | • |

| DATE 331 | TIME ZONE 332 | VEHICLE TYPE 333 | NUMBER OF STANDBY VEHICLES 334 | NUMBER OF WORKERS 335 | WEATHER 336 | EVENT INFORMATION 337 |
|---|---|---|---|---|---|---|
| 2017/12/19 | 9:00-10:00 | STANDARD-SIZED CAR | 80 | 5 | SUNNY | FERRY |
| 2017/12/19 | 9:00-10:00 | BUS | 50 | 8 | SUNNY | FERRY |
| 2017/12/19 | 9:00-10:00 | TRUCK | 40 | 8 | SUNNY | FERRY |
| • | • | • | • | • | • | • |

FIG. 3D 340

| DATE 341 | TIME 342 | WEATHER 343 | EVENT INFORMATION 344 |
|---|---|---|---|
| 2017/12/20 | 10:00 | SUNNY | FERRY |
| 2017/12/20 | 9:30 | SUNNY | FERRY |
| 2017/12/20 | 9:00 | SUNNY | FERRY |
| • | • | • | • |

INFORMATION PROCESSING APPARATUS, SYSTEM, METHOD, AND NON-TRANSITORY COMPUTER-READABLE STORAGE MEDIUM FOR ADJUSTING A NUMBER OF WORKERS IN A WORKSHOP

BACKGROUND OF THE INVENTION

Field of the Invention

The present invention relates to an information processing apparatus, a system, a method, and a non-transitory computer-readable storage medium.

Description of the Related Art

An invention for detecting the number of vehicles forming a line and performing predetermined control based on the detected number of vehicles has been proposed. Japanese Patent Laid-Open No. 2014-035633 proposes an invention for detecting the number of vehicles in standby at a drive-through and guiding the vehicles to an order area or a standby area to improve a traffic jam. In addition, Japanese Patent Laid-Open No. 10-214290 proposes an invention for predicting a waiting time for each tollgate, notifying a driver of the predicted waiting time, and instructing an appropriate gate.

However, a technique of adjusting the number of workers in a workshop where different works are conducted in accordance with a vehicle type has not been provided yet.

SUMMARY OF THE INVENTION

The present invention provides a technique of supporting adjusting the number of workers in a workshop where different works are conducted in accordance with a vehicle type.

An information processing apparatus comprising a calculation unit configured to determine a type of each vehicle included in an image obtained by capturing a first area where vehicles stand by, and calculate the first number of vehicles of each type, a decision unit configured to decide, in accordance with the first number of vehicles of each type, notification information concerning workers to be allocated in a second area where a predetermined work that changes in accordance with the type of the vehicle is conducted, and an output unit configured to output the notification information.

Further features of the present invention will become apparent from the following description of exemplary embodiments (with reference to the attached drawings).

BRIEF DESCRIPTION OF THE DRAWINGS

FIG. 3A is a table showing an example of the data structure of a vehicle inspection information database 310 in a database apparatus 300 corresponding to the embodiment of the present invention;

FIG. 3B is a table showing an example of the data structure of a worker information database 320 in the database apparatus 300 corresponding to the embodiment of the present invention;

FIG. 3C is a table showing an example of the data structure of a record database 330 in the database apparatus 300 corresponding to the embodiment of the present invention;

FIG. 3D is a table showing an example of the data structure of an event information database 340 in the database apparatus 300 corresponding to the embodiment of the present invention;

DESCRIPTION OF THE EMBODIMENTS

The embodiments of the present invention will now be described with reference to the accompanying drawings. Note that arrangements shown in the following embodiments are merely examples, and the present invention is not limited to the illustrated arrangements. In the following embodiments, a workshop used to inspect a plurality of types of vehicles will be exemplified as a workshop where different works are conducted in accordance with a vehicle type. In addition, inspection of a vehicle will be exemplified as a work in the workshop. However, this is merely an example, and the work is not limited to inspection of a vehicle. For example, the work need only be a work for a vehicle itself, a person (for example, an occupant) associated with a vehicle, an object (for example, a load) associated with a vehicle, and the like, and need only be a work conducted on a vehicle basis. In addition, the work need only be a work that changes in accordance with a vehicle type. For example, the work amount changes in accordance with a vehicle type.

Figure 1A:
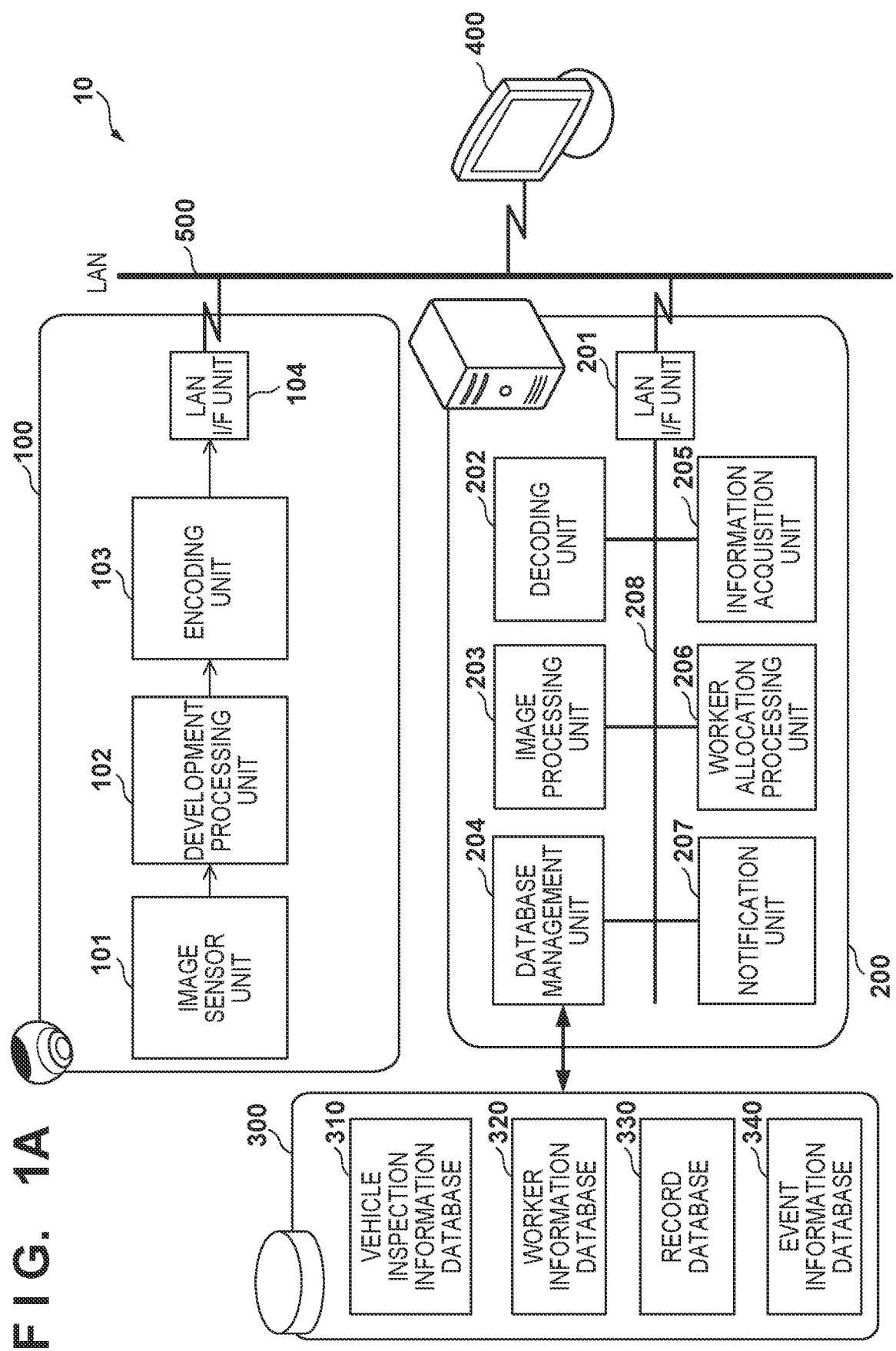
FIG. 1A is a block diagram showing an example of the arrangement of a workshop system 10 corresponding to an embodiment of the present invention.

FIG. 1A is a block diagram showing an example of the arrangement of a workshop system 10 corresponding to an embodiment of the present invention. The workshop system 10 is formed by connecting a network camera 100, an information processing apparatus 200, a database apparatus 300, and an information display apparatus 400 to each other by a LAN 500 that is a network line. The constituent elements of the workshop system 10 shown in FIG. 1A are merely examples, and other constituent elements may further be added. The constituent elements will be described below.

First, the network camera 100 can be configured to include an image sensor unit 101, a development processing unit 102, an encoding unit 103, and a LAN interface (I/F) unit 104. The image sensor unit 101 is formed by including an image capturing element such as a CMOS sensor configured to photoelectrically convert an optical image formed on the imaging plane and output an analog image signal, and an A/D converter configured to convert the analog image signal into a digital image signal. The development processing unit 102 executes predetermined development processing for the digital image signal output from the image sensor unit 101. The development processing can include, for example, DeBayer processing, white balance processing, tone conversion processing, edge enhancement correction processing, flaw correction, noise removal, enlargement/reduction processing, and color conversion to the YCbCr format.

The encoding unit 103 compresses and encodes the digital image signal output from the development processing unit 102 to generate image data to be provided to the information processing apparatus 200. The generated image data includes the identification information (camera ID) of the network camera 100, the information (position information) of the installation position, image capturing time information, and the like. The encoding unit 103 also sets a frame rate at the time of image data generation. Here, the image compression format for distribution can be based on, for example, a standard such as H.264, H.265, MJPEG, or JPEG. Image data of an arbitrary format including mp4 and avi format may be generated.

The LAN I/F unit 104 is a communication interface configured to transmit the image data output from the encoding unit 103 to the information processing apparatus 200 via the LAN 500. The LAN I/F unit 104 adjusts data exchange with a communication partner using, for example, a network file system such as NFS or CIFS or a network communication protocol such as UDP or TCP.

The arrangement of the information processing apparatus 200 will be described next. The information processing apparatus 200 includes a LAN interface (I/F) unit 201, a decoding unit 202, an image processing unit 203, a database management unit 204, an information acquisition unit 205, a worker allocation processing unit 206, and a notification unit (output unit) 207, and can be configured such that they are connected to each other via a system bus 208.

The LAN I/F unit 201 communicates with the network camera 100, the information display apparatus 400, or the external Internet via the LAN 500. The decoding unit 202 expands and decodes image data acquired from the network camera 100 via the LAN 500 to reconstruct a digital image signal. The reconstructed digital image signal is output to the image processing unit 203 that performs image analysis processing corresponding to this embodiment.

The image processing unit 203 performs vehicle detection processing of analyzing image data, detecting each vehicle standing by in a standby area 1 included in the image, determining the type of each vehicle, and calculating the number of vehicles existing in the standby area 1 on a vehicle type basis. Details of the vehicle detection processing will be described later. The database management unit 204 manages registered information in each of databases 310 to 340 of the database apparatus 300. For example, the database management unit 204 performs processing of updating the registered information of each database, extracting registered information from each database, and providing the registered information to each processing unit as needed. The information acquisition unit 205 acquires various kinds of event information from a predetermined external device via the Internet and the LAN I/F unit 201. Each acquired event information is stored in the event information database 340. The event information includes information about weather, information of an event associated with a facility in which the workshop system 10 is introduced, and the like. For example, when the workshop system 10 is introduced into an inspection site of vehicles in a port, piece of information concerning the departure date/time of a ship (ferry or the like) departing from the port, the number of loaded vehicles, and the like are registered.

The worker allocation processing unit 206 performs processing of deciding the number of workers to be allocated to inspect vehicles of each type in an inspection area 2 based on the registered information of each database in the database apparatus 300. Details of the worker allocation processing will also be described later. The notification unit 207 notifies (outputs) information concerning the replenishment and movement of workers to the information display apparatus 400 based on the processing result of the worker allocation processing unit 206. Details of notification information will be described later with reference to FIG. 8.

The database apparatus 300 is a database in which pieces of information to be referred to by the information processing apparatus 200 to execute processing corresponding to this embodiment are registered, and can include the vehicle inspection information database 310, the worker information database 320, the record database 330, the event information database 340, and the like. The database apparatus 300 is connected to the information processing apparatus 200. However, the database apparatus 300 may include a network interface and be connected to the LAN 500. In this case, communication between the information processing apparatus 200 and the database apparatus 300 is performed via the LAN I/F unit 201.

The vehicle inspection information database 310 is a database to register information concerning vehicles of inspection targets in the workshop to which the workshop system 10 is applied and the types of the vehicles. The worker information database 320 is a database to register information concerning workers who execute inspections in the workshop. The record database 330 is a database to register information concerning records obtained when inspections are executed actually, such as the number of workers allocated to inspect vehicles of each of various types in the workshop system 10 and the number of vehicles of each type detected in the standby area 1. The event information database 340 is a database to register event information acquired by the information acquisition unit 205 from the outside. Details of the data structures of these databases will be described later with reference to FIGS. 3A to 3D.

The information display apparatus 400 is an apparatus configured to display information transmitted from the information processing apparatus 200 and can be implemented by, for example, a personal computer (PC), a tablet terminal, a smartphone, or the like. The information display apparatus 400 can be connected to the LAN 500 by wire or wirelessly. Wireless connection can comply with, for example, a standard of wireless LAN such as IEEE 802.11. In this embodiment to be described below, the information display apparatus 400 is a personal computer serving as a display apparatus used to confirm a notification from the information processing apparatus 200 by a manager who manages the allocation of workers in the facility to which the workshop system 10 is applied.

In the arrangement of the workshop system 10 shown in FIG. 1A, the number of network cameras 100 can be an arbitrary number of 1 or more, and the number of network cameras is not limited. Each of the information processing apparatus 200, the database apparatus 300, and the information display apparatus 400 may be implemented by a single apparatus, or each function may be implemented by cooperation of a plurality of apparatuses. FIG. 1A shows a case in which the image processing unit 203 is provided on the side of the information processing apparatus 200. However, the image processing unit 203 may be provided on the side of the network camera 100. In this case, the information of the number of vehicles of each type calculated by the image processing unit 203 is transmitted from the network camera 100 to the side of the information processing apparatus 200.

Figure 1B:
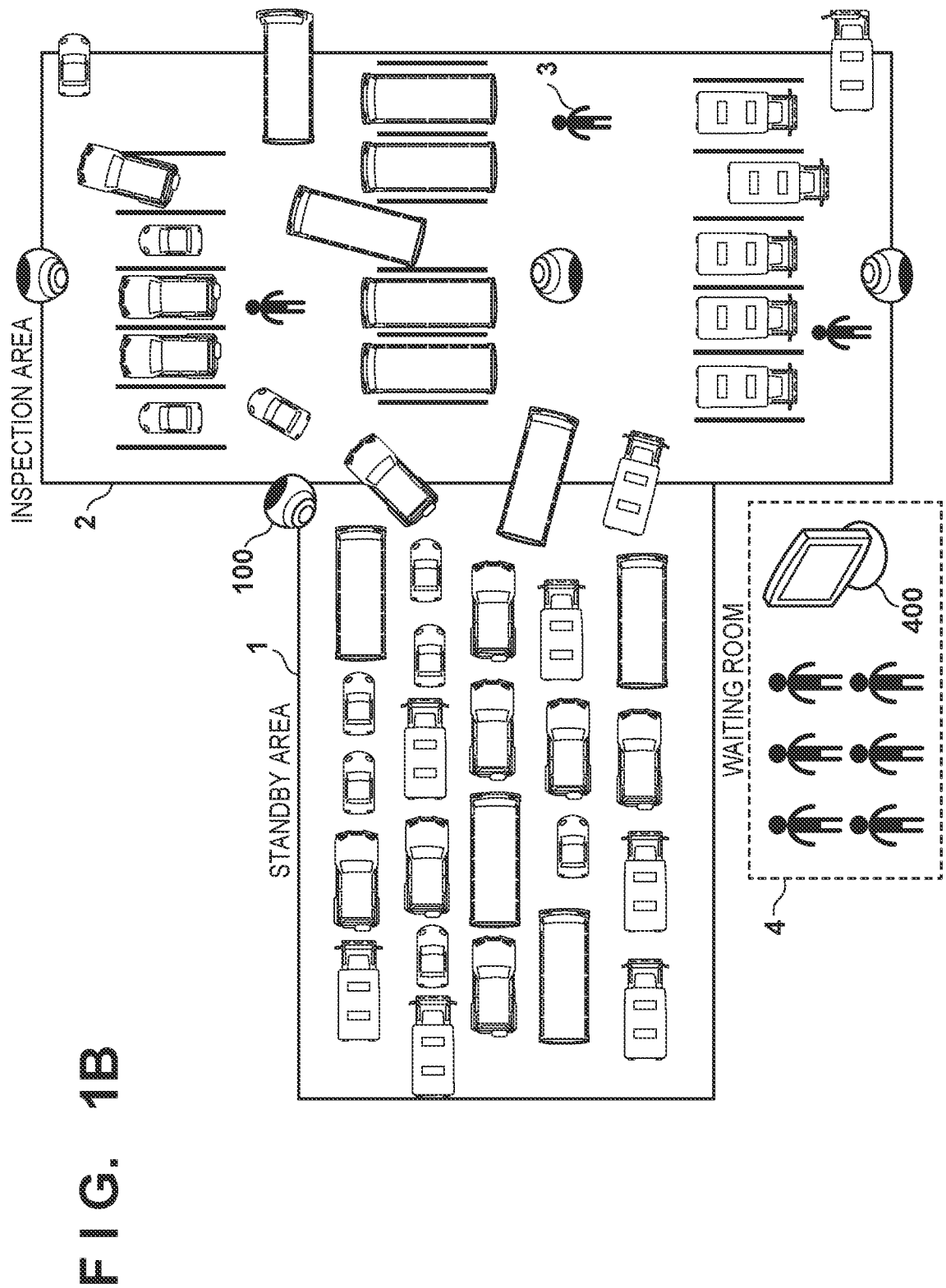
FIG. 1B is a view showing an example of an inspection site of vehicles to which the embodiment of the present invention is applicable.

The workshop system according to this embodiment can be applied to an inspection site of vehicles as shown in FIG. 1B. The inspection site of vehicles is roughly divided into the standby area 1 and the inspection area 2. The standby area 1 is an area where vehicles to be inspected stand by until they enter the inspection area 2. The inspection area 2 is an area where each vehicle is inspected by workers. Workers 3 in number determined for each vehicle type are allocated to the inspection area 2 and conduct inspections. Additionally, in this embodiment, an inspection region for each vehicle type in the inspection area 2 is determined in advance. In this embodiment, a case in which the vehicle types are classified into three types, that is, standard-sized car, bus, and truck will be described. This classification is determined based on the number of inspection items. The types may further be subdivided. In FIG. 1B, an inspection region on the upper side is assigned to standard-sized cars, an inspection region at the center is assigned to buses, and an inspection region on the lower side is assigned to trucks. Each vehicle is guided to the corresponding inspection region in accordance with the type and undergoes inspections by the workers. When the inspections end, each vehicle can leave the inspection region, and the next vehicle is guided to the vacant inspection region. As described above, the vehicle types are types based on, for example, the application purposes of vehicles (load transportation, passenger transportation, or the like).

The network cameras 100 are arranged in the standby area 1 and the inspection area 2, respectively, and capture the states of the standby area 1 and the inspection area 2. The number and arrangement positions of network cameras 100 arranged in the standby area 1 are not particularly limited as long as they are arranged to be able to capture all vehicles standing by in the standby area 1. FIG. 1B shows a case in which one network camera 100 performs image capturing. In addition, the network camera 100 may capture a moving image of the standby area 1 or may capture still images at a predetermined time interval. In the inspection area 2, network cameras in number capable of determining the inspection states of the workers are arranged. For example, it is possible to arrange a predetermined number of network cameras 100 in the inspection region of each type and monitor the inspection states of the workers. For example, it is possible to monitor whether a worker is actually conducting an inspection or is free.

FIG. 1B shows a case in which the standby area 1 and the inspection area 2 are physically clearly separated. However, the two regions need not be physically separated. In this case, for example, of the region where the vehicles stand by, a region where the workers are conducting inspections can be regarded as the inspection area 2, and the remaining region can be regarded as the standby area 1.

In addition, a waiting room 4 where the workers stand by is separately provided. The information display apparatus 400 may be installed in the waiting room 4. The manager replenishes or moves workers based on a notification concerning the replenishment or movement of workers, which is displayed on the information display apparatus 400.

Figure 2:
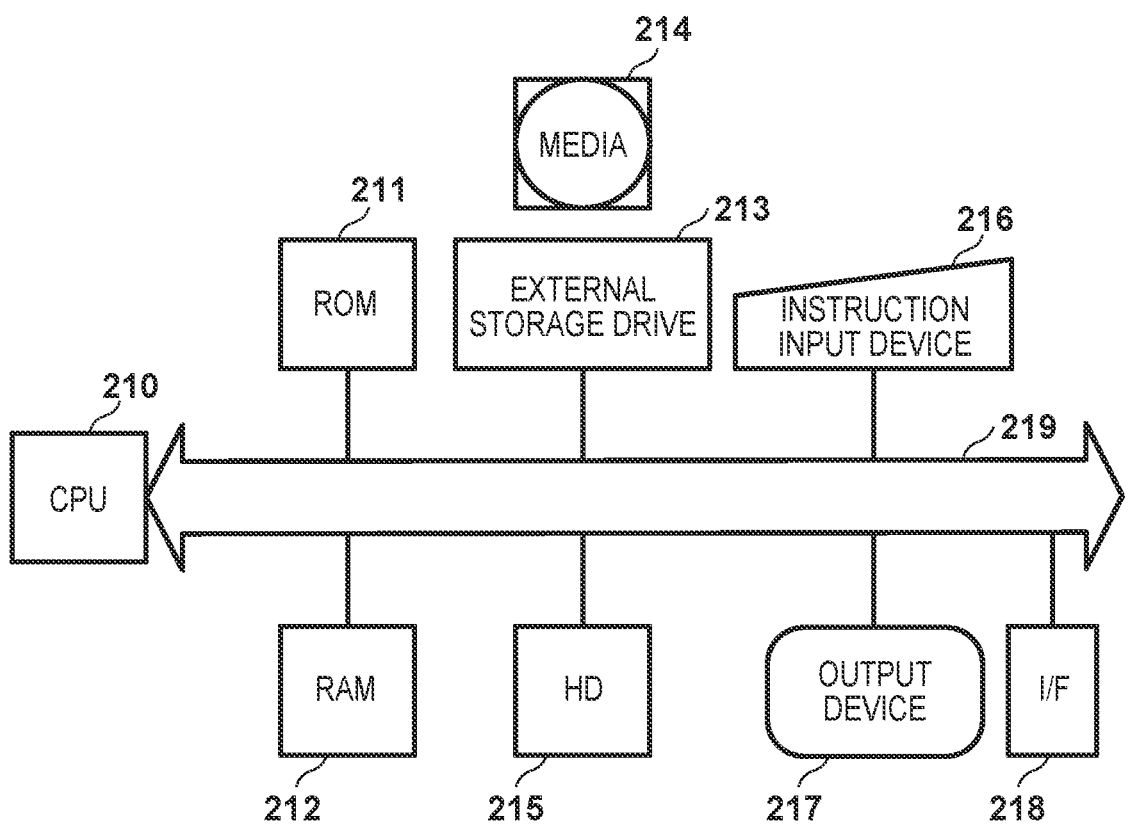
FIG. 2 is a block diagram showing an example of the hardware arrangement of an information processing apparatus 200 corresponding to the embodiment of the present invention.

The schematic arrangement of the information processing apparatus 200 that forms the workshop system 10 corresponding to this embodiment will be described next. FIG. 2 is a block diagram showing an example of the hardware arrangement of the information processing apparatus 200. The database apparatus 300 and the information display apparatus 400 each serving as the above-described information processing apparatus may be formed using the same or similar hardware arrangement.

Referring to FIG. 2, a CPU 210 performs control to execute an application program, an operating system (OS), a control program, and the like stored in a hard disk drive (to be referred to as an HD hereinafter) 215 and temporarily store information, a file, and the like necessary for execution of the program in a RAM 212. In addition, the CPU 210 executes processing corresponding to this embodiment based on image data provided by the network camera 100 and stored in the RAM 212 and information acquired from the database apparatus 300. Furthermore, the CPU 210 controls data transmission/reception to/from the external information display apparatus 400 via an interface (I/F) 218. Note that processes shown in FIGS. 4, 5A, and 5B to be described later are also implemented when the CPU 210 controls the entire apparatus by executing corresponding processing programs.

A ROM 211 internally stores various kinds of data such as an application program configured to execute predetermined processing in addition to a basic I/O program. The RAM 212 temporarily stores various kinds of data and functions as the main memory or work area of the CPU 210. The RAM 212 also temporarily stores information received from the network camera 100 or the database apparatus 300.

An external storage drive 213 is an external storage drive configured to implement access to a recording medium, and can load a program or the like stored in a medium (recording medium) 214 into the computer system. Note that as the medium 214, for example, a Floppy® disk (FD), a CD-ROM, a CD-R, a CD-RW, a PC card, a DVD, a Blu-ray®, an IC memory card, an MO, a memory stick, or the like can be used.

In this embodiment, the external storage device 215 uses an HD (hard disk) functioning as a mass memory. The HD 215 stores an application program, an OS, a control program, an associated program, and the like. Note that a nonvolatile storage device such as a Flash® memory may be used in place of the hard disk.

An instruction input device 216 corresponds to a keyboard, a pointing device (a mouse or the like), a touch panel, or the like. An output device 217 outputs a command input from the instruction input device 216 or a response output of the information processing apparatus 200 to the command. The output device 217 can include a display, a speaker, a headphone terminal, and the like. A system bus 219 controls the flow of data in the information processing apparatus 200.

The interface (to be referred to as an I/F hereinafter) 218 has a function of mediating data exchange with an external device. More specifically, the I/F 218 can include a wireless communication module, and the module can include a known circuit mechanism including an antenna system, an RF transmitter/receiver, one or more amplifiers, a synchronizer, one or more oscillators, a digital signal processor, a CODEC chip set, a subscriber identification module card, a memory, and the like. The I/F 218 can also include a wired communication module for wired connection. The wired communication module can communicate with another device via one or more external ports. The I/F 218 can also include various software components configured to process data. The external port is coupled with another device directly via Ethernet, a USB, an IEEE 1394, or the like or indirectly via a network. Note that an alternative of a hardware device may be formed by software that implements the same functions as those of the above-described devices.

Every time a corresponding program is operated to execute processing corresponding to this embodiment, the program may be loaded from the HD 215 in which the program is already installed into the RAM 212. In addition, the program according to this embodiment may be recorded in the ROM 211, configured to form part of a memory map, and directly executed by the CPU 210. Alternatively, the corresponding program and associated data may directly be loaded from the medium 214 into the RAM 212 and executed.

The data structures of the databases in the database apparatus 300 will be described next with reference to FIGS. 3A to 3D. First, FIG. 3A is a table showing an example of the data structure of the vehicle inspection information database 310. In the vehicle inspection information database 310, a vehicle type 311, the number 312 of inspection items, a processing time (1) 313, and a processing time (2) 314 are registered as information concerning the type of a vehicle as the inspection target of the workshop system 10.

The type of the vehicle as the inspection target in this embodiment is registered in the vehicle type 311. The type includes standard-sized car, bus, and truck. The type may include other types. In the number 312 of inspection items, the number of inspection items to be executed for a corresponding vehicle type is registered. In addition, not only the number but also the contents of the inspection items to be executed actually may be registered. Furthermore, not the inspection items to be executed for the vehicle but information representing a person (for example, an occupant) associated with the vehicle or the contents or number of works concerning an object associated with the vehicle may be registered. As the processing time (1) 313, the information of time necessary in a case in which the inspection items registered in the number 312 of inspection items are executed by one worker alone is registered. For example, the processing time 1 is 2 min in a case of standard-sized car. As the processing time (2) 314, the information of time necessary in a case in which the inspection items registered in the number 312 of inspection items are executed by two workers in pair is registered. For example, the processing time 2 is 1 min in a case of standard-sized car.

Next, FIG. 3B is a table showing an example of the data structure of the worker information database 320. In the worker information database 320, pieces of information concerning workers are registered. To manage the information concerning workers, an ID 321, a name 322, a date 323, a work start time 324, a break time 325, a work end time 326, a type 327 in charge, and an inspection form 328 are registered in the worker information database 320. In the ID 321, identification information for uniquely specifying each worker is registered. In the name 322, the name of each worker is registered. In the date 323, the date of a day when an inspection is conducted is registered. In the work start time 324, a time at which each worker starts a work is registered. In the break time 325, a time zone in which each worker takes a break is registered. In the work end time 326, a time at which each worker ends a work is registered. For example, if a worker works on a shift system, the time of so-called "begin" is registered in the work start time 324, and the time of "finish" is registered as the work end time 326. In the type 327 in charge, the type of a vehicle for which each worker is in charge of inspection is selected from a standard-sized car inspection, a bus inspection, and a truck inspection and registered. For a worker who is standing by in the waiting room 4, a value representing standby is registered, or the cell can be blank. In the inspection form 328, whether a worker is executing an inspection alone, or two workers are executing an inspection in pair is registered. The pieces of information shown in FIG. 3B are merely examples, and information other than these pieces of information can be registered as time information.

Next, FIG. 3C is a table showing an example of the data structure of the record database 330. In the record database 330, pieces of information concerning the number of workers and the number of standby vehicles when inspections were conducted in the past are registered. In the record database 330, a date 331, a time zone 332, a vehicle type 333, the number 334 of standby vehicles, the number 335 of workers, weather 336, and event information 337 are registered.

In the date 331, the information of a date when an inspection was conducted is registered. In the time zone 332, to enable grasping of the number of workers in each specific time zone, the information of a time zone is registered. The time zone may be delimited by a predetermined time unit, or a period in which the number of workers does not change may be registered as one time zone. The example of FIG. 3C shows a case in which a time zone of one hour is registered. In the vehicle type 333, the type of a vehicle is registered. In the number 334 of standby vehicles, the number of vehicles detected in the standby area 1 in the time zone registered in the time zone 332 is registered. As the number of vehicles to be registered, the average value of the numbers of vehicles detected in the time zone may be registered, or a maximum value may be registered. In the number 335 of workers, the number of workers allocated to each vehicle type in the time zone is registered. In the weather 336, the weather in the time zone is registered. In the event information 337, the information of an event associated with a standby vehicle is registered. FIG. 3C shows an example in a case in which vehicles that board a ferry are inspection targets.

Next, FIG. 3D is a table showing an example of the data structure of the event information database 340. In the event information database 340, pieces of event information acquired by the information acquisition unit 205 from an external device are registered. In the event information database 340, a date 341, a time 342, weather 343, and event information 344 are registered.

In the date 341, the date of acquired information is registered. Since the information acquisition unit 205 updates the event information database 340 every time it acquires information, the latest information at that point of time is registered in the event information database 340. In the time 342, the time when the information was acquired is registered. The information acquisition timing can be set at a predetermined time interval. In the weather 343, the information of weather at the time represented by the time 342 is registered. In the event information 344, the information of an event of the highest relevance at the time represented by the time 342 is registered. For example, in a case in which the vehicle to be inspected in the workshop at the port to which the workshop system 10 is applied is a vehicle that boards a ferry whose departure time is 11:00, the information of the ferry is registered. Pieces of detailed information of the ferry such as the name of the ferry, the departure time, and the number of loaded vehicles may further be registered in the event information.

Figure 4:
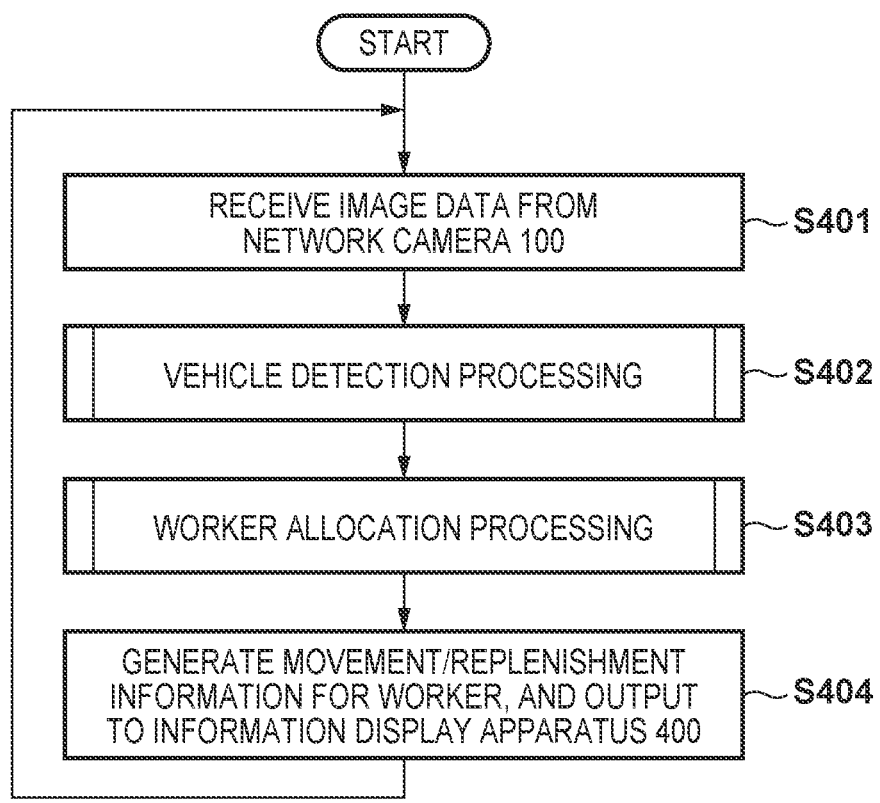
FIG. 4 is a flowchart showing an example of processing executed by the information processing apparatus 200 in the workshop system 10 corresponding to the embodiment of the present invention.

Processing executed by the information processing apparatus 200 based on image data received from the network camera 100 will be described next with reference to FIG. 4. FIG. 4 is a flowchart showing an example of processing executed by the information processing apparatus 200 in the workshop system 10 corresponding to the embodiment of the present invention.

First, in step S401, the information processing apparatus 200 acquires image data from the network camera 100 that captures the state of the standby area 1. In the information processing apparatus 200, the acquired image data is decoded by the decoding unit 202, and the obtained digital image is provided to the image processing unit 203. At this time, in the network camera 100, the image sensor unit 101 captures an image of a predetermined space or region as the image capturing target at the installation position and outputs a digital image signal to the development processing unit 102. The development processing unit 102 performs predetermined development processing and outputs the digital image signal as the processing result to the encoding unit 103. The encoding unit 103 compresses and encodes the input digital image signal to generate image data and transmits it to the information processing apparatus 200 via the LAN I/F unit 104. In this embodiment, a case in which one network camera 100 is arranged in the standby area 1 will be described. However, a plurality of network cameras 100 may be used.

Next, in step S402, the image processing unit 203 executes vehicle detection processing of performing image analysis of the digital image and determining the numbers and types of vehicles existing in the standby area 1. Details of the processing in step S402 will be described later with reference to the flowchart of FIG. 5A. Next, in step S403, the worker allocation processing unit 206 performs processing of adjusting the number of workers allocated in the inspection area 2 for each vehicle type based on the vehicle detection result in step S402. Details of the processing in step S403 will be described later with reference to the flowchart of FIG. 5B. Next, in step S404, the notification unit 207 generates information concerning the movement and replenishment of workers to be allocated in the inspection area 2 based on the processing result of step S403 and outputs the information to the information display apparatus 400.

Figure 5A:
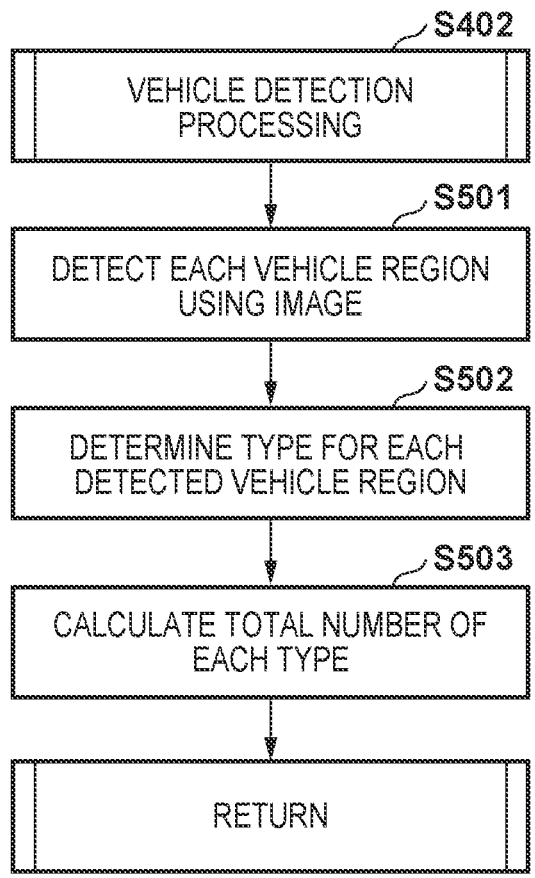
FIG. 5A is a flowchart showing an example of vehicle detection processing executed by the information processing apparatus 200 in the workshop system 10 corresponding to the embodiment of the present invention.

The vehicle detection processing of step S402 will be described next with reference to FIG. 5A. FIG. 5A is a flowchart showing an example of vehicle detection processing corresponding to the embodiment of the present invention.

First, in step S501, the image processing unit 203 executes predetermined image analysis processing for the digital image acquired from the decoding unit 202 and detects a vehicle region including each vehicle captured as an object. Next, in step S502, the image processing unit 203 determines the type of the vehicle included in each detected vehicle region. The types of vehicles are standard-sized car, bus, and truck, as described above, in this embodiment but are not limited to these. As for the type determination method, the determination can be done based on, for example, the shape or size. Alternatively, a predetermined template may be prepared, and the type may be decided based on the result of comparison with the template. As the type determination method for these vehicles, a known technology can be used. In addition, the information of the template or the like necessary for the type determination may be registered in the vehicle inspection information database 310.

Next, in step S503, the image processing unit 203 calculates the total number of vehicles (number of vehicles) of each type obtained as the result of the determination of step S502. For example, the number of vehicles existing in the standby area 1 can be calculated for each type, such as 120 standard-sized cars, 130 buses, and 250 trucks. This makes it possible to specify the ratio of vehicles standing by in the standby area 1 for an inspection on a type basis.

Figure 5B:
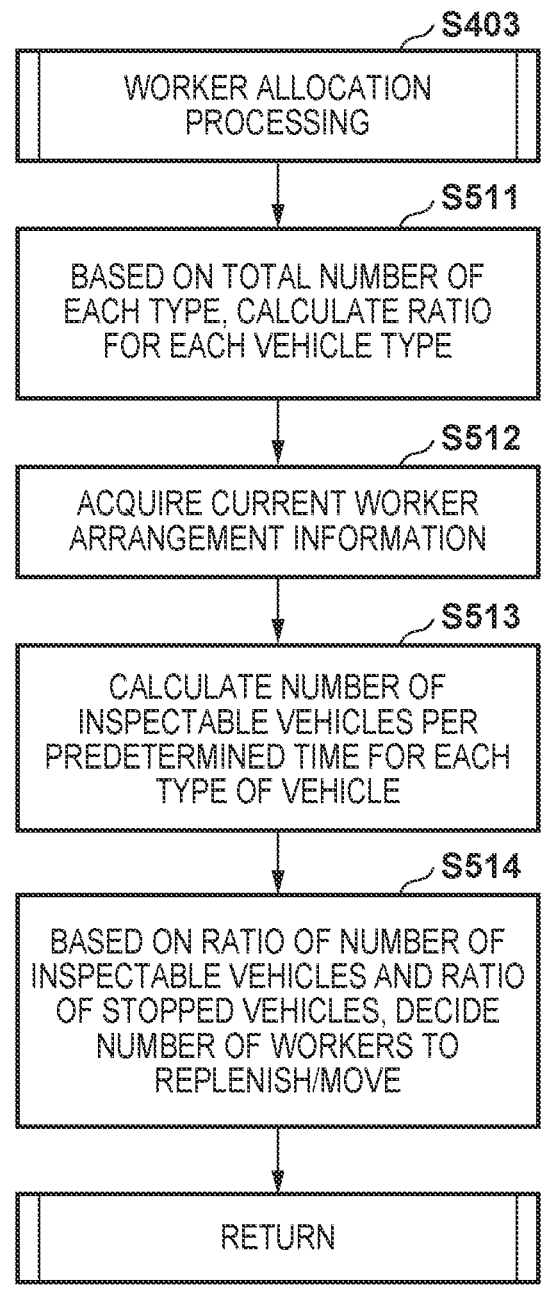
FIG. 5B is a flowchart showing an example of worker allocation processing executed by the information processing apparatus 200 in the workshop system 10 corresponding to the embodiment of the present invention.

The worker allocation processing of step S403 will be described next with reference to FIG. 5B. FIG. 5B is a flowchart showing an example of worker allocation processing corresponding to the embodiment of the present invention.

First, in step S511, the worker allocation processing unit 206 calculates the ratio of vehicles of each type based on the number of vehicles of each type calculated in step S503. For example, let Tc be the total number of vehicles, Tn be the number of standard-sized cars, Tb be the number of buses, and Tt be the number of trucks. A value obtained by dividing the number of vehicles of each type by the total number can be calculated as the ratio (%). A ratio Rn of standard-sized cars, a ratio Rb of buses, and a ratio Rt of trucks can be calculated by $Rn=Tn/Tc\times100$ $Rb=Tb/Tc\times100$ $Rt=Tt/Tc\times100$ Note that since a bus or truck is larger than a standard-sized car, if these vehicles can quickly be moved from the standby area 1, the congestion of the standby area 1 can be solved quickly. Hence, weighting may be done such that more workers are allocated for large-sized vehicles such as buses and trucks. For example, the ratio Rb of buses or the ratio Rt of trucks may be multiplied by a coefficient of 1 or more (for example, 1.2), and the ratio Rn of standard-sized cars may be multiplied by a coefficient smaller than 1 (for example, 0.8).

Next, in step S512, the worker allocation processing unit 206 acquires the information of workers allocated in the inspection area 2 and workers standing by in the waiting room at the current time from the worker information database 320. Next, in step S513, the worker allocation processing unit 206 calculates the number of inspectable vehicles per predetermined time for each vehicle type based on the number of workers allocated in the inspection area 2, which is acquired in step S512, and information registered in the vehicle inspection information database 310. The predetermined time (Tp) can be set to, for example, 1 min, 10 min, 30 min, or 60 min. The length of the predetermined time can be set in accordance with, for example, the time interval to execute the processing shown in FIG. 4. Then, in step S514, the worker allocation processing unit 206 adjusts the number of workers to be replenished and the number of workers to be moved such that the number of inspectable vehicles of each type calculated in step S513 becomes close to or substantially matches the ratio of vehicles of each type standing by in the standby area 1, which is calculated in step S511. This will be described below in more detail.

As shown in FIG. 3A, the number of inspection items changes between the vehicle types, and the necessary time for the inspection per vehicle changes. In addition, even of the same vehicle, the necessary time for the inspection changes between a case in which the inspection is executed by one worker alone and a case in which the inspection is executed by two workers in pair. This is divisionally registered as processing time 1 and processing time 2 in FIG. 3A. In consideration of these, the number of vehicles inspectable by the currently allocated workers within a predetermined time is calculated for each vehicle type.

First, if the vehicle type is standard-sized car, processing time 1 is 2 min, whereas processing time 2 is 1 min. When six workers each conducting the inspection alone are allocated, six vehicles can be inspected in 2 min, or 30 vehicles can be inspected in 10 min. When six workers conduct the inspection in pairs, three vehicles can be inspected in 1 min, or 30 vehicles can be inspected in 10 min. Hence, for the standard-sized cars, the total number of inspectable vehicles does not increase even when the personnel is doubled. If the personnel needs to be sent to another vehicle type, the workers who are in charge of standard-sized cars can be moved.

Next, if the vehicle type is bus, processing time 1 is 5 min, whereas processing time 2 is 3 min. When six workers each conducting the inspection alone are allocated, six vehicles can be inspected in 5 min, or 12 vehicles can be inspected in 10 min. When six workers conduct the inspection in pairs, six vehicles can be inspected in 3 min, or 18 vehicles can be inspected in 10 min. Hence, in a case of buses, the efficiency is higher when the workers perform the inspection in pairs. Hence, if there is sufficient personnel, people as many as possible are preferably used as workers in charge of buses and caused to execute the inspection in pairs.

Next, if the vehicle type is truck, processing time 1 is 3 min, whereas processing time 2 is 2 min. When six workers each conducting the inspection alone are allocated, six vehicles can be inspected in 3 min, or 18 vehicles can be inspected in 10 min. When six workers conduct the inspection in pairs, three vehicles can be inspected in 2 min, or 15 vehicles can be inspected in 10 min. Hence, in a case of trucks, the efficiency is higher when each worker performs the inspection alone. Hence, when the vehicle type is truck, the personnel is increased to increase the number of processable vehicles, and the workers are not used in pairs.

A detailed method of obtaining the number of inspectable vehicles per predetermined time (Tp) in step S513 will be described next. First, let NIn be the number of workers for standard-sized cars, NIn-1 be the number of workers each conducting the inspection alone, and NIn-2 be the number of workers conducting the inspection in pairs. The number Nn of inspectable standard-sized cars is given by $$Nn = NIn\text{-}1 \times (Tp/2) + NIn\text{-}2 \times (Tp/1)/2 \qquad (2)$$

wherein a fractional part is discarded in the operation Tp/m (m is processing time 1 or processing time 2), and the same applies hereafter.

When the maximum value of the number of simultaneously inspectable standard-sized cars, which is derived from the size of the inspection area 2, is represented by IMn, the number of workers allocatable to the standard-sized cars needs to satisfy a condition represented by IMn≥NIn-1+NIn-2/2.

Similarly, let NIb be the number of workers for buses, NIb-1 be the number of workers each conducting the inspection alone, and NIb-2 be the number of workers conducting the inspection in pairs. The number Nb of inspectable buses is given by $$Nb = NIb\text{-}1 \times (Tp/5) + NIb\text{-}2 \times (Tp/3)/2 \qquad (3)$$

In this case as well, when the maximum value of the number of simultaneously inspectable buses, which is derived from the size of the inspection area 2, is represented by IMb, the number of workers allocatable to the buses needs to satisfy a condition represented by IMb NIb-1+NIb-2/2.

Similarly, let NIt be the number of workers for trucks, NIt-1 be the number of workers each conducting the inspection alone, and NIt-2 be the number of workers conducting the inspection in pairs. The number Nt of inspectable trucks is given by $$Nt = NIt\text{-}1 \times (Tp/3) + NIt\text{-}2 \times (Tp/2)/2 \qquad (4)$$

Similarly, when the maximum value of the number of simultaneously inspectable trucks, which is derived from the size of the inspection area 2, is represented by IMt, the number of workers allocatable to the trucks needs to satisfy a condition represented by IMt≥NIt-1+NIt-2/2.

According to the above-described method, the numbers Nn, Nb, and Nt of inspectable vehicles of the vehicle types per predetermined time can be calculated. Next, in step S514, the number of workers for each type and the inspection form are adjusted such that the ratio of the thus calculated number of vehicles and the ratio of standby vehicles of each type in the standby area 1, which is obtained by equations (1), become almost equal, as indicated by $$Nn:Nb:Nt \approx Rn:Rb:Rt \qquad (5)$$

Note that the total number NItotal of workers at the point of time of deciding the number of workers can be obtained based on the registered information of the worker information database 320. Then, the number of workers to be replenished or moved can be decided for each type based on the number of workers and the number of currently allocated workers for each type and for each inspection form, which are obtained by the above-described processing.

The processing described in association with FIGS. 4, 5A, and 5B can repetitively be executed at, for example, a predetermined time period. In addition, based on the image data captured by the network camera 100 that monitors the standby area 1 if the number of vehicles standing by in the standby area 1 changes by a threshold or more, or if the ratio of vehicles of each type varies by a predetermined value or more, the processing may also be executed. Furthermore, based on the image data captured by the network camera 100 arranged in the inspection area 2, the image processing unit 203 may determine the working ratio of the workers and execute the processing based on the determination result.

For example, if it is determined that the working ratio of workers allocated to vehicles of a certain type is low, and the working ratio of workers for vehicles of another type is high, it is considered that the workers are preferably moved. Hence, the allocation of the workers can be readjusted by executing the above-described processing again. At this time, the adjustment is done such that the number of workers allocated to the vehicle type for which the working ratio is determined to be low becomes smaller than the number of currently allocated workers.

Here, the working ratio of the workers can be determined based on, for example, the positional relationship between the inspection target vehicles and the workers, which is obtained by analyzing the image provided from the network camera 100 arranged in the inspection area 2. For example, since a worker who is conducting the inspection is normally located near the vehicle, whether the worker is conducting the inspection can be determined by determining whether a vehicle can be detected near the worker. For the workers allocated for each vehicle type, it is determined whether they are actually conducting the inspection. If all the workers are conducting the inspection, the working ratio is 100%. However, for example, if a state in which no vehicle exists near two of five workers continues for a predetermined time, the working ratio is 60% for the type.

When the working ratio is lower than a predetermined ratio (for example, 70%), the image processing unit 203 can determine to perform readjustment of worker allocation. At the time of readjustment, the number of workers may be decided based on the working ratio. For example, in the above example, since the state in which two of five workers are not conducting the inspection continues for a predetermined time, the two workers may be removed and sent to the inspection of another vehicle type.

Figure 6:
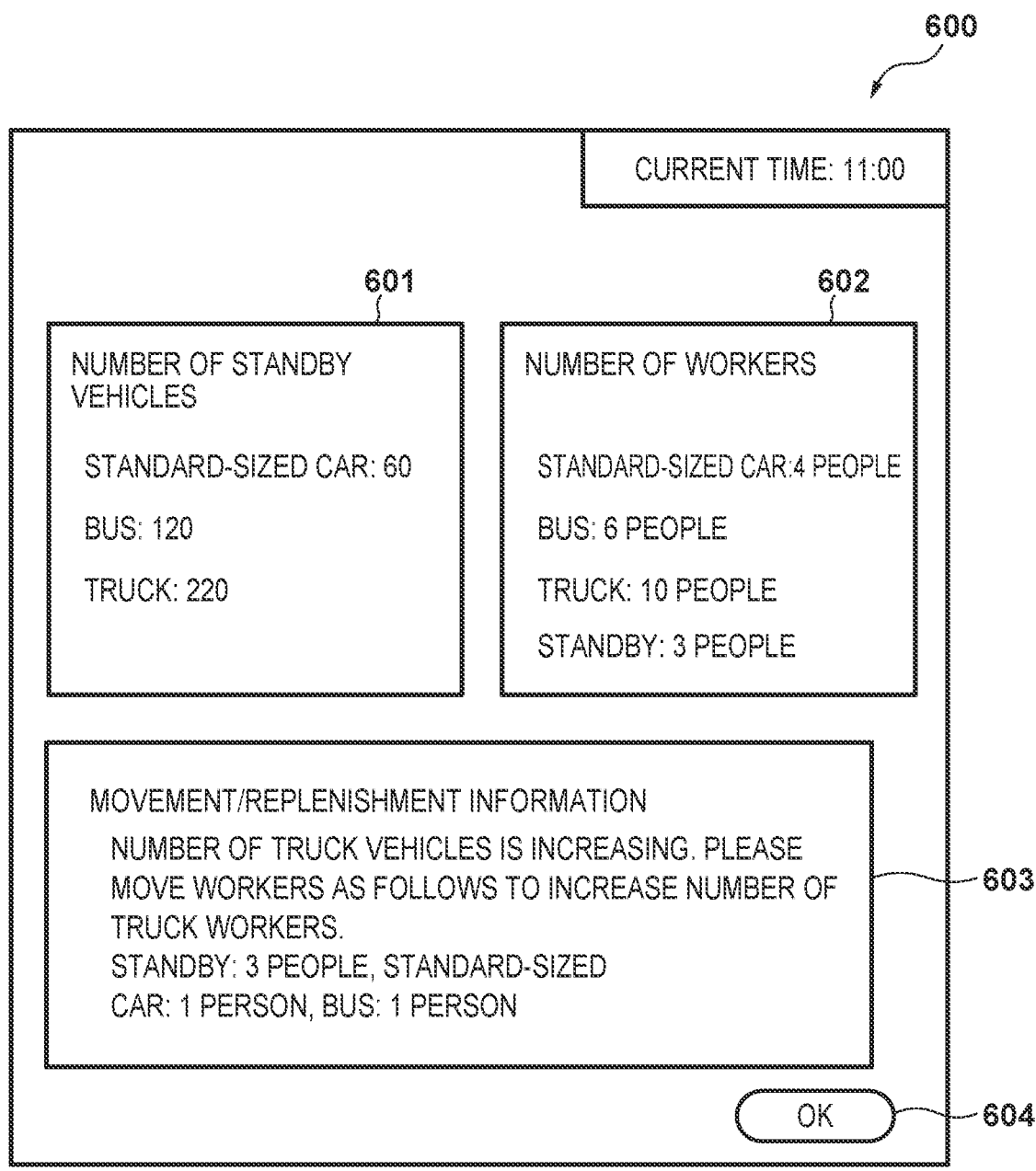
FIG. 6 is a view showing an example of a screen displayed on an information display apparatus 400 corresponding to the embodiment of the present invention.

Next, an example of a display result of movement and replenishment information of workers obtained by the above-described series of processes is shown in FIG. 6. FIG. 6 is a view showing an example of screen display on the information display apparatus 400. In a screen 600, a region 601 displays the number of vehicles standing by in the standby area 1 on a vehicle type basis. A region 602 displays the number of currently allocated workers for each vehicle type and the number of current standby workers. A region 603 displays the information of the number of workers to be replenished or moved for each type, which is obtained by the above-described processing shown in FIG. 5B. In the example shown in FIG. 6, since the number of standby trucks is large, the workers for trucks need to be increased. Hence, a message to replenish three standby workers and also move one worker from standard-sized cars and one worker from buses is displayed. An OK button 604 is operated to make an acknowledgement concerning the movement/replenishment of the workers and transit to a screen to allocate the workers. When the OK button 604 is clicked, the screen transits to a screen for displaying a list of workers assigned the day. In the list, the workers who should move to the inspection of trucks are selected, and the type in charge and the inspection form (alone or pair) are changed. The input result here is reflected on the registered contents in the worker information database 320. Note that in the region 603, only the type of vehicles for which the number of workers should be increased may be displayed. For example, only a message "increase workers for trucks" may be displayed without displaying the number of workers. That is, only information about the type of vehicles for which the number of workers should be increased may be output as notification information.

According to the above-described arrangement, it is possible to decide the number of workers who are allocated in the inspection area 2 and are to be replenished or moved for each vehicle type in accordance with the ratio of vehicles of each type standing by in the standby area 1 and inspect the standby vehicles without delay.

Second Embodiment

In the above-described embodiment, the types of all vehicles included in a range that can be captured by the network camera 100 are discriminated, and the number of vehicles is calculated. In this case, even a vehicle located near the inspection area 2 and a vehicle that has just reached the standby area 1 are equally handled to calculate the number of vehicles. In this case, if the types of vehicles are evenly distributed in the entire inspection area 2, no problem arises. If the distribution is uneven, particularly, if vehicles of a specific type are located densely near the inspection area 2, the overall throughput lowers unless the vehicles of the type are preferentially inspected. Hence, in this embodiment, the number of workers for each vehicle type is adjusted in consideration of the number of vehicles of each type in the proximity region or neighboring region of the inspection area 2.

More specifically, in this embodiment, in the process of step S503 of FIG. 5A, in addition to the number of vehicles in an entire inspection area 2, the number of vehicles of each type is further calculated for vehicles standing by in the proximity region of the inspection area 2. Alternatively, the number of vehicles of each type may be calculated for a predetermined number of vehicles (for example, 50 vehicles) from the first vehicle standing by in a standby area 1. The vehicles as the additional calculation targets will collectively be referred to as "proximity vehicles" hereinafter.

Next, in the process of step S511 of FIG. 5B, in addition to calculating the ratio of vehicles of each type for the entire standby area 1, the ratio of each type is calculated for the proximity vehicles. At this time, for example, letting Tc' be the total number of proximity vehicles, Tn' be the number of standard-sized cars, Tb' be the number of buses, and Tt' be the number of trucks, a value obtained by dividing the number of vehicles of each type by the total number can be calculated as the ratio (%). When equations (1) are deformed using a ratio Rn' of standard-sized cars, a ratio Rb' of buses, and a ratio Rt' of trucks, the values can be calculated based on $$Rn'=Tn'/Tc'\times 100$$

$$Rb'=Tb'/Tc'\times 100$$

$$Rt'=Tt'/Tc'\times 100 \tag{1'}$$

Rn', Rb', and Rt' are compared with corresponding values Rn, Rb, and Rt. If a value having a difference equal to or more than a threshold exists, equation (5) is deformed as follows based on Rn', Rb', and Rt'.

$$Nn:Nb:Nt \approx Rn':Rb':Rt' \tag{5'}$$

Next, in step S514, the number of workers for each type and the inspection form are adjusted such that the ratio of the number of vehicles calculated in step S513 and the ratio of standby vehicles of each type in the standby area 1, which is obtained by equations (1'), become almost equal, as indicated by equation (5').

Note that the determination as to whether to perform the adjustment using equation (5') may be based on not only the comparison between Rn', Rb', and Rt' and Rn, Rb, and Rt but also whether the difference of each of the values Rn', Rb', and Rt' is larger than a threshold. Alternatively, a threshold (for example, 60%) may be defined, and if a value more than the threshold exists, the adjustment may be performed based on equation (5'). This can cope with a case in which the ratio that a vehicle of a specific type is a proximity vehicle is conspicuously high. On the other hand, to cope with a case in which a vehicle of a specific type is rarely included in the proximity vehicles, a low threshold (for example, 20%) may be defined, and if a value less than the threshold exists, the adjustment may be performed based on equation (5').

In addition, a case in which the ratio of vehicles in the entire standby area 1 is always calculated has been described above. However, the number of allocated workers may be adjusted based on the ratio only in the proximity region of the inspection area 2 without performing the calculation.

According to this embodiment, it is possible to adjust the allocation of workers in accordance with the type of standby vehicles of each type in the proximity region of the inspection area 2.

Third Embodiment

In the above-described two embodiments, a form in which the allocation of workers in the inspection area 2 is adjusted based on the current number of vehicles in the standby area 1 has been described. A result obtained by adjusting the allocation of workers in this way is registered in the record database 330. Since past information is accumulated in the record database 330, it is also possible to, based on this information, predict the number of workers who are needed. In this embodiment, a method of adjusting the allocation of workers based on record information in a record database 330 will be described.

Figure 7:
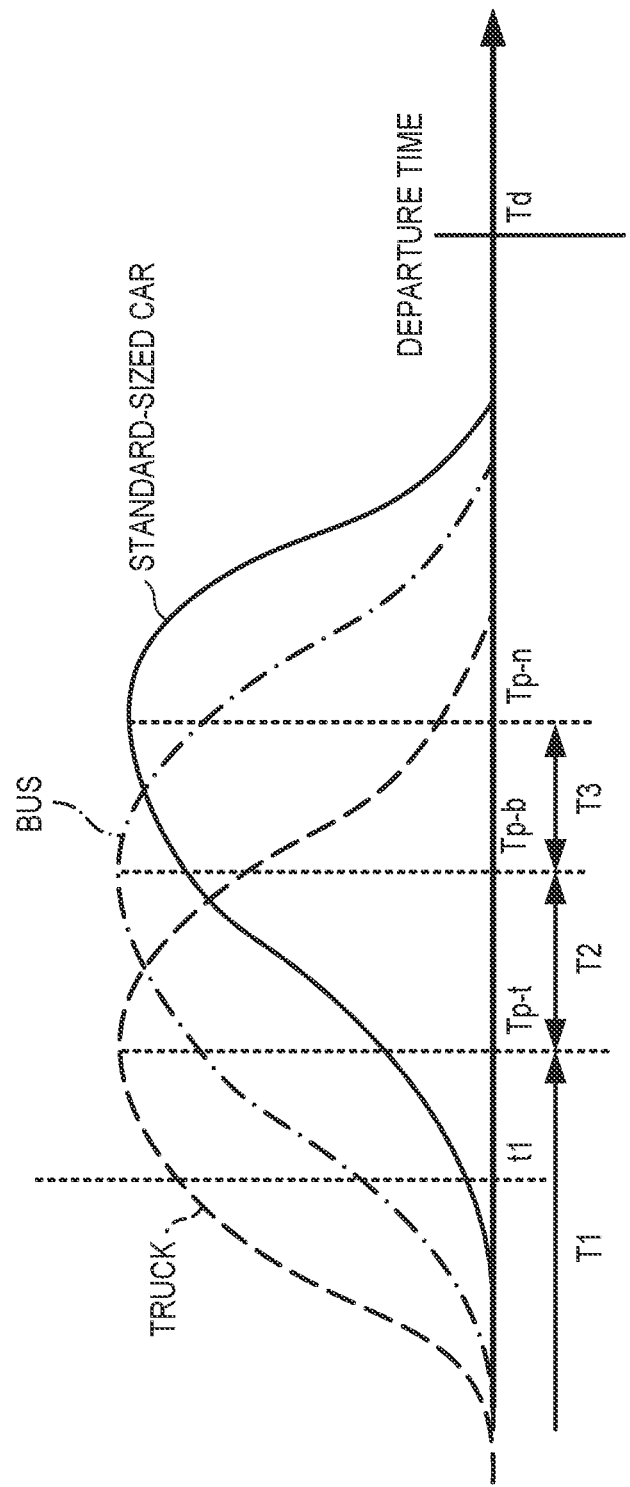
FIG. 7 is a graph showing an example of the time distribution of statistical information corresponding to the embodiment of the present invention.

FIG. 7 is a graph showing an example of the time distribution of the numbers of vehicles that are planned to board a ferry with a predetermined departure time and are standing by in a standby area 1. This graph is a graph showing, as a time distribution, the number of vehicles of each type standing by in the standby area 1 retroactively from a reference time (the departure time of the ferry) associated with a predetermined event, that is, the departure of the ferry. This distribution is shown for a descriptive convenience as an example of statistical information calculated based on the past information registered in the record database 330. In FIG. 7, the peak time zones of trucks, buses, and standard-sized cars are different. Hence, when focusing on only the peak time zone of each vehicle type, the number of vehicles of the type is largest. For this reason, if the actual transition of the number of vehicles corresponds to the statistics toward the peak of a certain vehicle type, the workers are preferably allocated to each vehicle type so as to cope with the ratio of the number of vehicles at the peak time of the vehicles. Note that the heights of the peaks are the same for the sake of descriptive simplicity. However, the types may have different peak values.

For example, when the distribution of the numbers of vehicles at time t1 in FIG. 7 is observed, the ratio of trucks is high because the peak of trucks is approaching, and the ratios of buses and standard-sized cars are low. However, the ratio of buses abruptly rises after that. Hence, if the workers are allocated in accordance with the ratios of the numbers of vehicles at time t1, it may be impossible to cope with the subsequent abrupt increase in the number of buses. The delay in the coping leads to a delay in inspection and an increase in the number of standby vehicles, resulting in lowering of the whole throughput. To prevent this, if the peaks are distributed as shown in FIG. 7, the number of workers may be adjusted in accordance with the ratio of the number of vehicles at the peak time.

More specifically, let T1, T2, and T3 be time zones between the peaks of the vehicles. In the time zone T1, the ratio of trucks is raising toward the peak. During this time, Rn, Rb and Rt in the first embodiment are corrected based on the ratio of trucks at the peak time (Tp–t). For example, if the ratio Rn:Rb:Rt of the numbers of vehicles actually detected at the current time (Td–t1 before the departure time) corresponding to t1 on the time distribution shown in FIG. 7 is almost the same as the ratio at timing t1 in the statistical information as shown in FIG. 7, the values Rn, Rb, and Rt are modified (corrected) in accordance with the peak that comes first after the current time. In this case, since the peak that comes first is the peak of trucks, the values Rn, Rb, and Rt are modified in accordance with the value at the time Tp–t. This is a case in which the actual detection result of the numbers of vehicles almost matches the statistical information. On the other hand, if the ratio Rn:Rb:Rt of the numbers of vehicles actually detected at the current time corresponding to t1 in FIG. 7 is different from the ratio at timing t1 in FIG. 7, for example, if the number of standard-sized cars or buses is larger than that of the statistical information, and the peak of standard-sized cars or buses is predicted to be advanced, the correction is not performed, and the number of workers is adjusted based on the actually detected numbers of vehicles.

In addition, when the peak of the number of vehicles of a certain type is over, the number of vehicles of the type only decreases from then on. For this reason, the workers are preferentially allocated to the vehicles of other types. In the example shown in FIG. 7, when the peak of trucks ends, the peak of buses comes next. Hence, the number of workers is adjusted in accordance with the ratio of the numbers of vehicles at the peak of buses. At this time, the timing of adjusting the workers may be decided in accordance with the length of the period between the peak and the peak. For example, the timing of performing worker allocation adjustment according to the peak of buses can be decided in accordance with the length of the period represented by T2 in FIG. 7 between the peak of trucks and the peak of buses. For example, in a case in which the time T2 is shorter than a predetermined threshold time, since the peak of buses and the increase in the number of standard-sized cars come in a short time, an adjustment to the ratio according to the peak of buses should be performed when the peak of trucks is over. On the other hand, in a case in which the time T2 is longer than the threshold time, a time margin to some extent can be expected up to the peak of buses and the increase in the number of standard-sized cars. It is therefore possible to perform allocation adjustment according to the actually detected number of vehicles first and then perform worker allocation adjustment according to the peak of buses a predetermined time before the peak of buses. Processing at this time is the same as that described concerning trucks.

For the time zone T3 after the peak of buses is over until the peak of standard-sized cars comes, the processing can be performed as in the time zone T2.

A case in which worker allocation adjustment is performed based on the graph, shown in FIG. 7, of the time distribution of the numbers of vehicles that are planned to board a ferry with a predetermined departure time and are standing by in the standby area 1 has been described above. For the time distribution shown in FIG. 7, information about weather may be taken into consideration. For example, time distributions can be prepared by subdividing the graph of the time distribution as shown in FIG. 7 based on weather conditions. More specifically, a time distribution for fine weather, a time distribution for rainy weather, a time distribution for snowy weather, and the like can be prepared. When A time distribution according to the weather of the day is selected, and processing is performed in the same way as described above, the worker allocation can further be optimized in accordance with the weather condition.

According to this embodiment, it is possible to predict future tendency based on statistical information extracted from the past record and adjust the number of workers allocated to each vehicle type. Accordingly, standby vehicles can be inspected without delay.

Other Embodiments

The embodiments have been described above in detail. The present invention can take an embodiment as, for example, a system, an apparatus, a method, a program, or a recording medium (storage medium). More specifically, the present invention may be applied to a system formed by a plurality of devices (for example, a host computer, an interface device, an image capturing apparatus, a web application, and the like) or may be applied to an apparatus formed by a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-254403 filed on Dec. 28, 2017 and No. 2018-060741, filed on Mar. 27, 2018 which are hereby incorporated by reference herein in their entirety.

What is claimed is:

1. An information processing apparatus included in a system having a plurality of network cameras, a database, and a display device, for deciding a number of workers in an inspection area, the information processing apparatus comprising:
   one or more processors; and
   at least one memory storing executable instructions, which when executed by the one or more processors, cause the information processing apparatus to act as:
      an obtaining unit configured to obtain an image captured by a network camera, among the plurality of network cameras, which is installed in a standby area where vehicles stand by;
      a calculation unit configured to determine, based on a shape of object stored in a database, a type of a vehicle included in the image, and calculate a first number of vehicles of each type;
      a decision unit configured to decide, based on the first number of vehicles and an inspection time for each type of vehicle, a number of workers to be allocated in the inspection area where an inspection work is conducted in accordance with the type of the vehicle, and to decide notification information concerning the decided number of workers; and
      an output unit configured to output the notification information to the display device.

2. The information processing apparatus according to claim 1, wherein the output unit outputs, as the notification information, information concerning a type of vehicles for which the workers should be increased in the inspection area.

3. The information processing apparatus according to claim 1, wherein the notification information includes at least one of the number of workers who change the type of vehicles for which the work is to be conducted and the number of workers to be newly allocated in the inspection area from a standby state.

4. The information processing apparatus according to claim 1, wherein the executable instructions which when executed by the one or more processors, cause the information processing apparatus to further act as:
   a determination unit configured to determine, for each type, a working ratio of the workers allocated for each type, based on a positional relationship between the workers and vehicles included in an image obtained by capturing the inspection area,
   wherein after the output by the output unit is performed, if which there is a type for which the determination unit determines that the working ratio of the workers is lower than a third threshold, the calculation by the calculation unit, the decision by the decision unit, and the output by the output unit are executed again.

5. The information processing apparatus according to claim 4, wherein the decision unit decides, based on the working ratio, the number of workers to conduct the work for vehicles of the type for which the working ratio is determined to be lower than the third threshold in the workers needed to inspect the vehicles of each type.

6. The information processing apparatus according to claim 1, wherein the calculation unit calculates a first ratio as a ratio of vehicles in the standby area on a type basis, based on the first number of vehicles, and
   wherein the decision unit decides, in accordance with the first ratio, the number of workers to be allocated in the inspection area.

7. The information processing apparatus according to claim 6, wherein
   the decision unit calculates a second ratio for each type, as a ratio of vehicles in the inspection area on a type basis, based on the number of workers currently allocated for each type in the inspection area, from the number of vehicles of each type for which the work can be conducted within a predetermined time, and
   decides the number of workers based on a first ratio, for each type as a ratio of vehicles in the standby area, and the second ratio.

8. The information processing apparatus according to claim 7, wherein the decision unit decides the number of workers by adjusting the number of workers for each type such that the second ratio becomes close to the first ratio.

9. The information processing apparatus according to claim 8, wherein the output unit outputs, as the notification information, information based on a difference between the number of workers for each type after the adjustment and the number of currently allocated workers for each type.

10. The information processing apparatus according to claim 7, wherein a necessary time for the work per vehicle is determined in advance for each type of vehicles, and the decision unit calculates, based on the necessary time for each type and the number of workers for each type, the number of vehicles of each type for which the work can be conducted within the predetermined time.

11. The information processing apparatus according to claim 7, wherein the calculation unit further determines a type of a vehicle existing in a predetermined region in the standby area and calculates a second number of vehicles, and as for a third ratio for each type, as a ratio of vehicles in the predetermined region on a type basis, based on the second number of vehicles, in a case in which a type whose ratio is higher than a first threshold exists or in a case in which a type whose ratio is lower than a second threshold smaller than the first threshold exists, the decision unit decides the number of workers based on the second ratio and the third ratio.

12. The information processing apparatus according to claim 11, wherein the predetermined region includes a region of the standby area, which is close to the inspection area.

13. The information processing apparatus according to claim 11, wherein the predetermined region is a leading region of the standby area, which is connected to the inspection area, and is a region in which a predetermined number of vehicles stand by.

14. The information processing apparatus according to claim 7, wherein the decision unit refers to statistical information of a time distribution that shows the number of vehicles of each type standing by in the standby area retroactively from a reference time concerning a predetermined event, and modifies the first ratio based on a fourth ratio, as a ratio of vehicles in the first standby area on a type basis, of the number of vehicles of each type at a point of time corresponding to current time on the time distribution in a case in which a time concerning the predetermined event associated with the vehicles currently standing by in the first standby area is made to correspond to the reference time.

15. The information processing apparatus according to claim 14, wherein upon determining that the fourth ratio and the first ratio correspond to each other, the decision unit modifies the first ratio based on a fifth ratio of the number of vehicles of each type at a peak of the number of vehicles of any type, which comes earliest after the point of time corresponding to the current time on the time distribution.

16. The information processing apparatus according to claim 14, wherein the statistical information is generated in association with each of a plurality of different weathers, and the decision unit refers to the statistical information corresponding to a current weather.

17. The information processing apparatus according to claim 14, wherein the predetermined event is a departure of a ship that the vehicle boards, and the reference time corresponds to departure time of the ship.

18. A method of controlling an information processing apparatus included in a system having a plurality of network cameras, a database, and a display device, for deciding a number of workers, the method comprising:

determining, by a processor of the information processing apparatus, based on a shape of object stored in the database, a type of a vehicle included in an image captured by a network camera, among the plurality of network cameras, which is installed in a standby area where vehicles stand by, and a first number of vehicles of each type;

deciding, by the processor, based on the first number of vehicles and an inspection time for each type of vehicle, a number of workers to be allocated in an inspection area where an inspection work is conducted in accordance with the type of the vehicle, and deciding notification information concerning the decided number of workers; and outputting, by the processor, the notification information to the display device.

19. A non-transitory computer-readable storage medium storing a program that, when executed by a processor of an information processing apparatus included in a system having a plurality of network cameras, a database, and a display device, for deciding a number of workers, causes a processor to perform:

determining, based on a shape of object stored in the database, a type of a vehicle included in an image captured by a network camera, among the plurality of network cameras, which is installed in a standby area where vehicles stand by, and a first number of vehicles of each type;

deciding, based on the first number of vehicles and an inspection time for each type of vehicle, a number of workers to be allocated in an inspection area where an inspection work is conducted in accordance with the type of vehicle, and deciding notification information concerning the decided number of workers; and outputting the notification information to the display device.

20. The information processing apparatus according to claim 1, wherein the calculation unit is configured to determine, based on templates of each type of vehicles in the image obtained by the obtaining unit, a type of a vehicle included in the image, and calculate a first number of vehicles of each type.

21. The information processing apparatus according to claim 1, wherein the decision unit is configured to decide the number of worker, using a working ratio of workers the working ratio determined based on an image captured by an image device in the inspection area.

22. The information processing apparatus according to claim 1, wherein the decision unit is configured to calculate a second number of vehicles for each type that can be inspected per given time using the inspection time for each type of vehicle, and decide the number of worker using the first number of vehicles of each type and the second number of vehicles.

* * * * *